(No Model.)
H. A. CHASE.
TELEPHONIC SYSTEM.
No. 524,480. Patented Aug. 14, 1894.
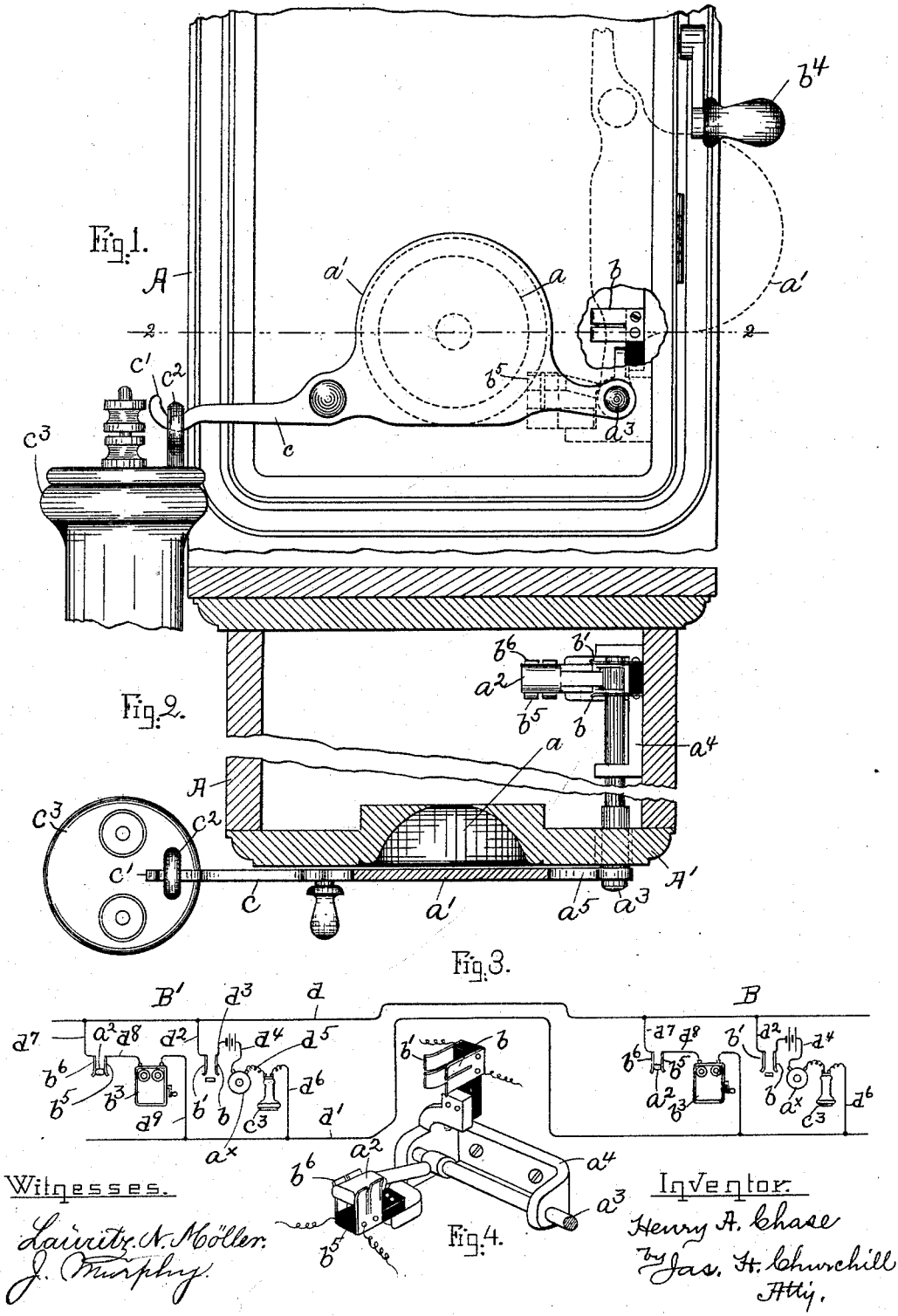
Witnesses.
Lairitz N. Möller.
J. Murphy.
Inventor.
Henry A. Chase
by Jas. H. Churchill
Atty.

UNITED STATES PATENT OFFICE.

HENRY A. CHASE, OF BOSTON, MASSACHUSETTS, ASSIGNOR TO ALBERT WATTS, OF SAME PLACE.

TELEPHONIC SYSTEM.

SPECIFICATION forming part of Letters Patent No. 524,480, dated August 14, 1894.

Application filed April 16, 1894. Serial No. 507,648. (No model.)

*To all whom it may concern:*

Be it known that I, HENRY A. CHASE, residing in Boston, in the county of Suffolk and State of Massachusetts, have invented an Improvement in Telephonic Systems, of which the following description, in connection with the accompanying drawings, is a specification, like letters on the drawings representing like parts.

This invention is an improvement in a system for telephonic communication, and relates more particularly to the transmitting apparatus, which, in accordance with this invention, has co-operating with it a device controlling the accessibility to the mouth piece or opening of the transmitter, and operatively connected to a circuit controller governing the circuit of the said transmitter, the said device, for the best results, being operatively connected to a second circuit controller, which may and preferably will govern the circuit of the calling or signaling device, which may be the usual magneto now commonly employed in telephone systems, but which second circuit controller may govern the circuit of any desired form of signaling or calling instrument.

The device controlling the accessibility to the mouth piece of the transmitter is preferably connected to the two circuit controllers above referred to, in such manner that when the device is in one position, as for instance, when it covers or partially covers the mouth piece of the transmitter, one of the circuit controllers is in its open circuit position, and the other circuit controller is in its closed position, and when the device is moved so as to uncover the mouth piece of the transmitter, the positions of the circuit controllers will be reversed.

The device referred to, may and preferably will be made in the form of a pivoted or hinged shield or cover, having an arm extended from it and forming a hook upon which the usual handphone may be suspended, so that when the handphone is taken from the hook, it will be necessary to positively move the cover or shield so as to uncover the mouth piece of the transmitter to render the latter accessible, and this movement of the cover or shield insures the positive operation of the circuit controllers to place the line circuit in the proper condition, as will be described.

These and other features of this invention will be pointed out in the claims at the end of this specification.

Figure 1 represents in front elevation a sufficient portion of a telephonic transmitting apparatus embodying this invention to enable it to be understood, the cover or shield for the mouth of the transmitter being shown in its normal position and having suspended thereon a handphone, only the upper portion of which is shown. Fig. 2 is a sectional plan view on the line 2—2, Fig. 1; Fig. 3, a diagram of circuits to be referred to, and Fig. 4, a detail in perspective to be referred to.

In the present embodiment of this invention, the transmitting apparatus is shown as a box or case A provided with a door A' having a mouth piece $a$ (see Fig. 2) corresponding in shape to the usual mouth piece now common to telephonic transmitters and behind which is located the diaphragm $a^x$ represented in Fig. 3.

In accordance with this invention, the mouth piece $a$ has co-operating with it a movable cover or shield $a'$ herein-represented as of sufficient size to entirely cover the mouth piece, but which may in practice be made so as to but partially cover the said mouth piece. The shield or cover $a'$ has operatively connected to it a circuit controller governing the circuit of the transmitting apparatus, and in the present embodiment of this invention, this circuit controller is shown as a movable member or arm $a^2$ fast on a rock shaft $a^3$ having bearings in a suitable bracket $a^4$ within the box or case A, the shaft $a^3$ being extended through the front A' of the said box, and having fast on it in any suitable manner an arm $a^5$ of the shield or cover $a'$. The movable member $a^2$ of the circuit controller co-operates with two contacts or terminals $b\ b'$, so that when the member $a^2$ of the circuit controller is in engagement with the terminals $b\ b'$, the circuit of the transmitter will be closed at this particular point.

The box or case A containing the transmitting apparatus, may and preferably will contain a calling apparatus, preferably the usual or well known magneto apparatus $b^3$ shown in diagram, Fig. 3, and such as now commonly employed in telephonic systems and which is operated by means of the crank $b^4$.

The circuit of the magneto apparatus $b^3$ may and preferably will be governed by the movement of the cover or shield $a'$, and to effect this result, I prefer that the member $a^2$ of the circuit controller for the transmitting apparatus should also co-operate with terminals $b^5$ $b^6$ for the magneto apparatus, which is effected by placing the terminals $b^5$ $b^6$ within the box or case A at an angle of about ninety degrees from the terminals $b$ $b'$ of the transmitting circuit, so that the cover or shield $a'$ will be required to be moved through a distance sufficient to uncover the mouth piece $a$ in order to effect the desired change in the circuit as will be described.

In the normal condition of the shield or cover $a'$, the mouth piece $a$ of the transmitter is wholly or partially closed and when in this condition, the circuit of the magneto is completed by the engagement of the member $a^2$ with the terminals $b^5$ $b^6$ as represented in Figs. 3 and 4. If, now it is desired to hold communication through the transmitter, the shield or cover $a'$ must be positively moved so as to uncover the mouth piece $a$ of the transmitter, and in this positive movement of the cover or shield $a'$, the circuit controlling member $a^2$ is withdrawn from engagement with the terminals $b^5$ $b^6$ and is engaged with the terminals $b$ $b'$ of the transmitting circuit, when the cover or shield $a'$ has been turned or moved the desired or required distance, which is represented in Fig. 1 by the dotted lines as substantially at right angles to the normal position. The cover or shield $a'$ is provided with the extension or arm $c$ having a hook $c'$ at its end to be engaged by a screw eye $c^2$ on the handphone $c^3$.

The operation of my improved telephonic system may be readily understood from an inspection of Fig. 3, wherein $d$ $d'$ represent a line circuit including two telephonic apparatuses marked B B', but which also may include other forms of signaling instruments. The line wire $d$ has connected to it the terminal $b'$ by the wire $d^2$, and the terminal $b$ is connected to one pole of the battery $d^3$, the other pole of which is connected by wire $d^4$ through the transmitter, the latter being connected by wire $d^5$ to the handphone $c^3$, which is connected by wire $d^6$ to the other line wire $d'$. The terminal $b^6$ of the magneto circuit controller is connected to the line wire $d$ by the wire $d^7$, and the terminal $b^5$ is connected by wire $d^8$ to the magneto $b^3$, which is connected by wire $d^9$ to the other line wire $d'$. The circuit connections between the line wires $d$ $d'$ for all the instruments in the line may be the same as just described.

In the diagram, Fig. 3, it will be noticed that the circuit controlling member $a^2$ is in engagement with the terminals $b^5$ $b^6$ of the magneto circuit for the instruments B B', and the line, therefore, is in condition for calling.

Let it be supposed that the operator at the instrument B' desires to communicate with the operator at the instrument B. In this case, the operator at B' calls up the operator at B in the usual manner by turning the crank $b^4$, and when answer has been made, the operators at both instruments remove the handphones from the hooks $c'$, and turn the movable cover or shield so as to uncover the mouth piece $a$ and place the circuit controlling member $a^2$ of each instrument into engagement with the terminals $b$ $b'$ for the transmitter circuit, in which condition, the circuit through the transmitter of each instrument is completed while the circuit through the magneto is open. When the operators at the instruments have ceased talking, the movable cover or shield $a'$ in the present adaptation of this invention must be lowered into its normal position, in order to afford means upon which to hang the handphone.

I claim—

1. The combination with an electric circuit, of a telephonic transmitting apparatus provided with a mouth piece and adapted to be included in said circuit, a circuit controller governing the said transmitter circuit, and a movable cover or shield co-operating with the mouth piece of the said transmitter and operatively connected to the said transmitter circuit controller, and provided with an arm $c$ having a hook $c'$ to support the receiver, substantially as described.

2. The combination with an electric circuit, of a telephonic transmitting apparatus provided with a mouth piece and adapted to be included in the said circuit, a magneto generator adapted to be included in the said line circuit, circuit controllers governing the said transmitter and magneto, and a movable cover or shield co-operating with the mouth piece of the transmitter and operatively connected to the said circuit controllers and provided with an arm $c$ having a hook $c'$ to support the receiver, substantially as described.

In testimony whereof I have signed my name to this specification in the presence of two subscribing witnesses.

HENRY A. CHASE.

Witnesses:
 JAS. H. CHURCHILL,
 J. MURPHY.